US006948663B1

(12) United States Patent
Graham, Jr. et al.

(10) Patent No.: US 6,948,663 B1
(45) Date of Patent: Sep. 27, 2005

(54) YARD CHEMICAL DISPENSING APPARATUS

(76) Inventors: William C. Graham, Jr., 120 Macmillan Rd., NE., Cleveland, TN (US) 37323; Annette Michelle Graham, 120 Macmillan Rd., NE., Cleveland, TN (US) 37323

(*) Notice: Subject to any disclaimer, the term of this patent is extended or adjusted under 35 U.S.C. 154(b) by 154 days.

(21) Appl. No.: 10/462,517

(22) Filed: Jun. 16, 2003

(51) Int. Cl.[7] .............................................. A62C 5/02
(52) U.S. Cl. ........................ 239/10; 239/69; 239/70; 239/201; 239/207; 239/310; 239/316; 239/317; 239/565; 239/305; 137/268
(58) Field of Search ................... 239/1, 10, 67, 239/69, 70, 200, 201, 207, 302–305, 407, 239/565, DIG. 15, 315–317, 310; 137/268, 137/624.11, 624.12

(56) References Cited

U.S. PATENT DOCUMENTS

| 5,660,330 A | * | 8/1997 | Scott | 239/305 |
| 5,730,364 A | * | 3/1998 | Gertie | 239/201 |
| 5,769,318 A | * | 6/1998 | Greubel | 239/10 |
| 5,772,115 A | * | 6/1998 | Vaughn | 239/69 |
| 5,908,157 A | * | 6/1999 | Antonellis et al. | 239/70 |
| 6,540,156 B2 | * | 4/2003 | Martin | 239/317 |
| 6,618,977 B1 | * | 9/2003 | Curro | 239/302 |

* cited by examiner

Primary Examiner—Steven J. Ganey
(74) Attorney, Agent, or Firm—Stephen J. Stark; Miller & Martin PLLC

(57) ABSTRACT

A chemical distribution apparatus contains at least one, and preferably multiple chambers which house magazines which accept solid lawn treatment chemicals such as fertilizers, herbicides, fungicides, insecticides, lime treatments, pre-emergents, post-emergents, and the like. As water is passed into the chemical distribution apparatus, it is preferably selectively controlled by a controller to a particular chamber for distribution of a particular chemical in accordance with a pre-set schedule.

19 Claims, 2 Drawing Sheets

YARD CHEMICAL DISPENSING APPARATUS

FIELD OF THE INVENTION

This invention relates to devices and methods for dispensing dissolved chemical treatments and more particularly to devices and methods for distributing lawn care products provided in a solid form which are dissolved and provided to a yard through an irrigation system.

BACKGROUND OF THE INVENTION

Yard care including the treatment of grass and/or plant beds with fertilizers, weed control, insect or fungal control and/or other chemical treatments is a very large market in the United States, and probably elsewhere. Many people take pride in their yards and are willing to spend large sums of money to protect their investment and the look of their yard.

In order to treat lawns, numerous technological advances have occurred including U.S. Pat. No. 6,012,649 which shows a housing adapted to support a number of canisters of liquid chemical treatments. This housing is connected to an irrigation system such as those sold by Rain Bird Sprinkler Manufacturing Corporation so that the various liquid chemicals can be directed to the yard of a user. However, whatever chemicals are added in the dispenser shown in the '649 patent are apparently delivered to the entire yard. Furthermore, while liquid chemicals have various advantages in that they are already dissolved in liquid and they are easily disbursed via a stream of water, they also have a number of disadvantages. Specifically, concentrated liquids may pose a risk to pets or small children, and may result in overconcentration to a desired area of the yard thus providing a negative effect when a desired effect was sought. Specifically, over fertilizing is well known to kill plants. If the water supply is secured and the chemicals are directed to the outlet, they may continue out the system undiluted.

U.S. Pat. No. 5,927,610 shows a fertilizer dispensing apparatus which dispenses a solid fertilizer core in which water is run through the inside surfaces of a hollow cylinder of solid chemical fertilizer. Although this delivery method is believed to be an improvement over the prior art, improvements in the delivery of solid fertilizer with fluid streams are believed to exist. Specifically, this design prevents water from contacting exterior surfaces of the fertilizer cylinder while allowing fluid to only contact the interior bore portion of the cylinder. Furthermore, this device appears to be adapted for use with a hose instead of an irrigation system.

Accordingly, a need exists for an improved yard chemical distribution system and method.

SUMMARY OF THE INVENTION

A need exists for a chemical distribution apparatus having a housing which accepts at least one stream of water from a water supply and directs the stream through at least one magazine containing solid lawn chemicals therein. Furthermore, in the preferred embodiment, the housing contains a plurality of magazines which may be separated from one another along with separate water flows such that the output from the magazines may be directed to specific locations in the yard of the user with a desired chemical solution. In this manner, different magazines may be filled with different chemicals for treating different areas of a yard at different times or on different intervals. Furthermore, with the use of a controller, specific cylinders may be utilized or bypassed at a specific time of the year, month, week, and/or day. With attention paid to the design of the magazines and their placement in flows of fluid, it may be possible to obtain several cycles of use without needing to reload the magazine. The user may elect to only fill the cartridges with the appropriate chemicals for particular purposes. The controller, when utilized, opens or closes valves which allows the supply of water to enter the magazine and then be directed towards a specific location in the yard containing dissolved chemicals therein.

A somewhat sophisticated controller may be utilized in more advanced embodiments with the controller operating valves to specifically direct chemicals to portions of the yard at specific times of the day, month, or year. With a preloaded housing and selection of relatively slow dissolving solids, very little manual work need be required to treat a yard. The controller may also bypass the addition of chemicals in some embodiments to selectively provide water without a specific chemical at specific times. Of course, simpler embodiments may not have bypass or controller functions.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
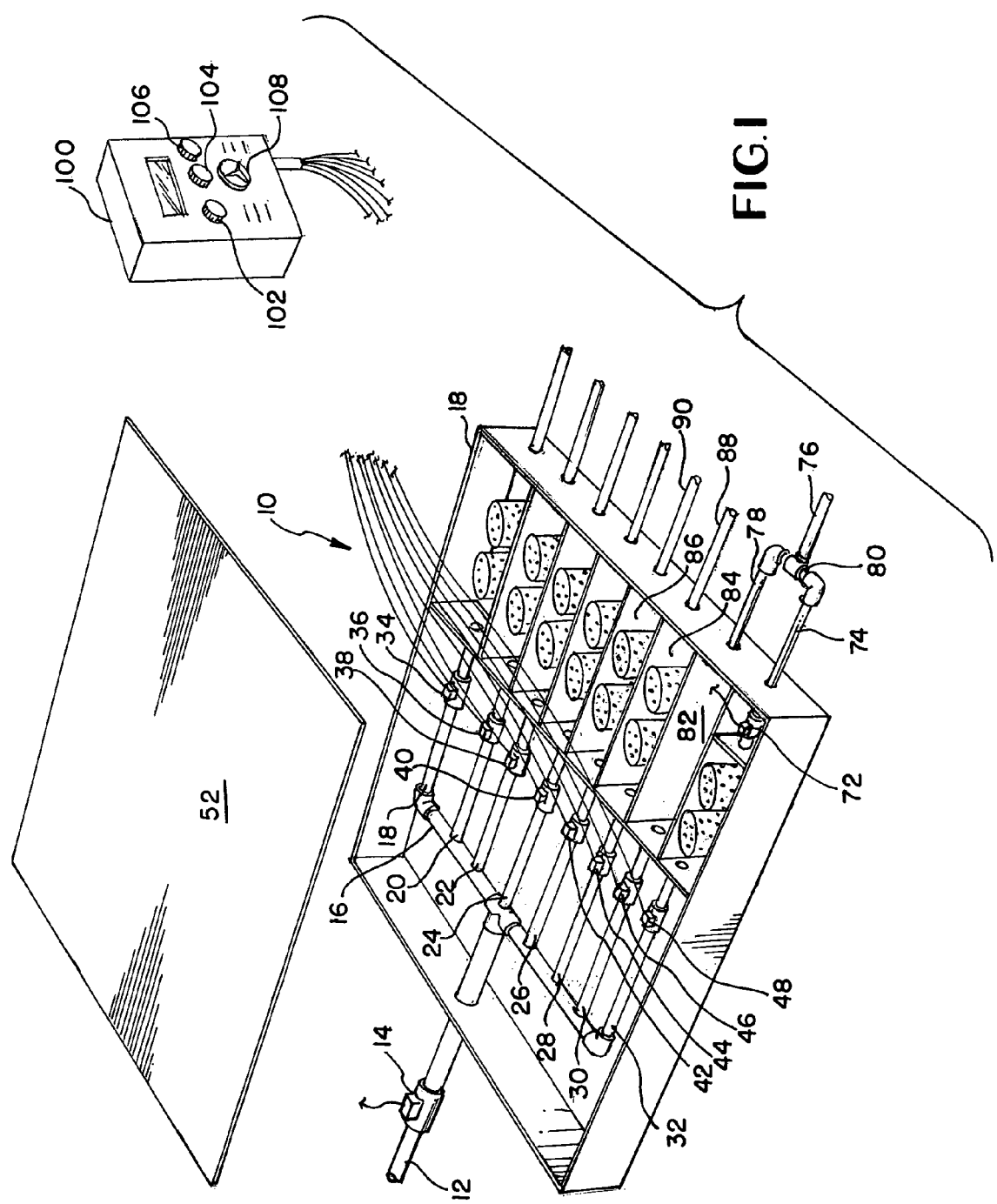
FIG. 1 shows the presently preferred embodiment of a lawn chemical distribution box for use with an irrigation system of the present invention.

FIG. 1 shows a distribution box 10 which receives an input 12 such as from a water supply. Typically the input 12 is connected near the water meter along an edge of a particular piece of property and downstream of a back flow preventer. Of course, in other embodiments the input 12 may be connected to a faucet from a structure or other source of water. Black poly pipe or Schedule 40 PVC pipe are commonly used with irrigation systems ad would provide a satisfactory input 12.

Inlet valve 14 is illustrated so that the supply of water into the box 10 may be secured by an operator or controller 16 by closing inlet valve 14. Inlet valve 14 is preferably secured when the irrigation system is not in use to conserve water and to not over water the yard. Downstream of the inlet valve 14 is a manifold 16 which may be located interior to or exterior of housing 18. In the embodiment of FIG. 1, the manifold 16 directs water to supply lines, 20, 22, 24, 26, 28, 30. The supply lines, 20, 22, 24, 26, 28, 30, 32 are preferably equipped with inlet supply valves 34, 36, 38, 40, 42, 44, 46, 48 which are illustrated internal to housing 18, but could be external in other embodiments. The supply inlet valves 34, 36, 38, 40, 42, 44, 46, 48 are preferably controlled by controller 16 as it is described in further detail below.

Figure 2:
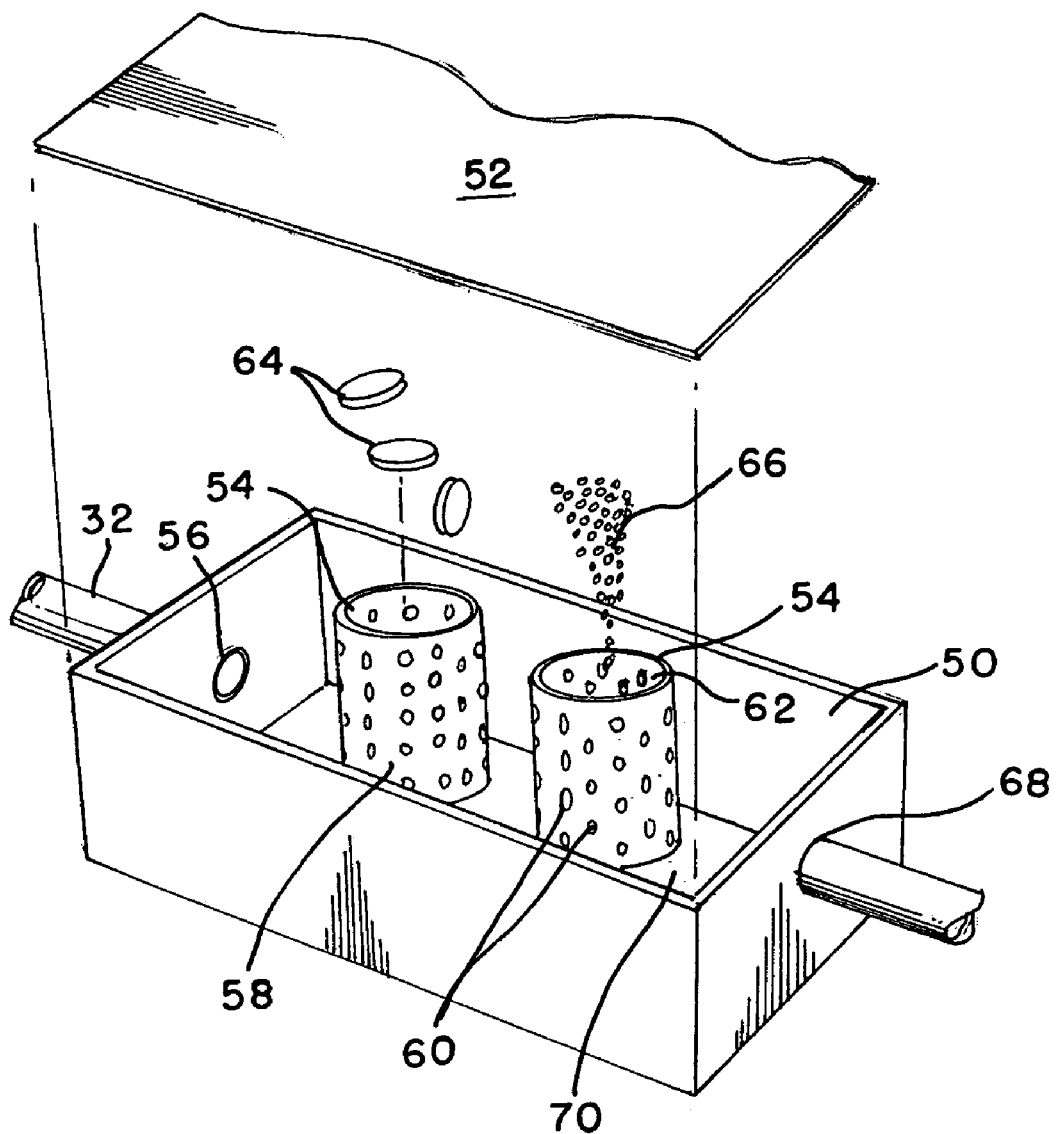
FIG. 2 shows a portion of the box of FIG. 1 in detail.

FIG. 2 is useful in describing the flow from a supply line 32 and out of the box 10 which is illustrative of the other supply line and outlet operations. Supply line 32 is illustrated as directing water to a chamber 50. At least the chamber 50 is capable of being made water tight with the addition of top member 52 which assists in maintaining a water tight barrier about housing 18 and/or chamber 50. In FIG. 1, top member 52 makes the interior of housing 18 watertight. As water enters the chamber 50, it preferably encounters one or more magazines 54 which are illustrated positioned within and preferably substantially transverse, or perpendicular, to a flow of water from the supply 32. The magazines 54 are preferably located in the flow of the stream from the outlet of the supply line 32 or the inlet 56 of the chamber 50. As water proceeds from the inlet 56 into the chamber 50 it contacts the exterior surface 58 of the magazine 50 and proceeds through orifices 60 into the core 62 of the magazine 54. The core 62 houses at least one and preferably a plurality of solid lawn chemical tablets such as disks 64, pellets 66, or other appropriate shape. Of course, combinations of various shaped solids may be placed in the magazines. Various shaped magazines 54 other than cylindrical may also be utilized.

As the water enters through the orifices 60 into the core 62, the flow of water dissolves the solid fertilizer 64 or 66 located within the cores 62 of the magazine 54. The orifices 60 are preferably sufficiently small so that the magazine 54 acts as a filter to retain undissolved particles within the magazine 54. Additional filters may be located internal or external to the magazines 54 to prevent solid particles from leaving the box 10 and potentially interfere with the operation of such items as sprinklers or feeding tubes downstream in the irrigation system.

Depending on the size of the magazines 54 and the positioning of the magazine(s) 54 within the chamber 50, the desired flow from the supply line 32 to the magazines 54 dissolves the solid fertilizer in the cores 62. Accordingly, the desired concentration exits the chamber 50 and proceeds through outlet 68. In some embodiments, the magazines 54 may be replaceable as a disposable item while in other embodiments the magazines 54 may be mounted to the housing 18 such as along the floor 70. The magazines 54 may be reloaded in this embodiment.

With the magazines 54 in place, they may be loaded with solid chemical lawn treatment such as fertilizer, lime treatments, insecticides, fungicides, herbicides, weed treatment systems, pre-emergent, post-emergent, or other appropriate solid chemicals utilized to treat lawns and/or plants. Of course, the magazines 54 could be loaded prior to their insertion within the cavity 50 as well. Once the magazines 54 are loaded, the top 52 may be replaced to contain fluid within the cavity 50 if not the entire contents of the housing 18. One or more tops 52 may be utilized.

Preferably, the magazines 70 extend from the floor 72 to the top member 52 within the cavity or chamber 50. This design prevents the need for tops and bottoms on the magazine, however, other embodiments could otherwise account for the possibility of particulate solids breaking off of the disks 64 otherwise to prevent pellets 66 from coming out of tops or bottoms of the magazine 54.

In operation water enters through the inlet 32 and proceeds though the magazines 54 to dissolve some of the particulate treatment chemicals located in the magazine 54. The solution is then transported through outlet 68 which will be discussed in further detail below. The solid chemicals are preferably selected so that they release at a desired concentration of solution under an expected flow. This is believed to prevent over concentration being delivered to the yard. Some solid chemicals are also expected to last for more than one use; such as for a plurality of days' use.

Referring back to FIG. 1, as solution leaves the outlet 68 it passes through isolation valve 72 and is directed through header 74 toward lawn supply 76. In the embodiment illustrated in FIG. 1, an alternate path 78 is also utilized to supply lawn supply 76. Header 80 is connected to supply chamber 82 which has been purposely left without any magazines 54 therein and in this manner water may be sent through the supply line 30 through isolation valve 46 and into chamber 82 to bypass the first chamber 50 so that water without any chemicals dissolved in it may be supplied to lawn supply 76. The outlet isolation valve 72 may be closed during this step in some embodiments to prevent the inadvertent flow of chemicals from first chamber 50 when utilized in this manner.

While some portions of the system may be fed by the bypass as shown by these two chambers 50, 82, it is also possible that chambers such as adjacent chamber 84, 86 contains magazines 54. Some of the magazines 54 may not be filled with chemicals at a particular time whereas other magazines 54 may be filled with some type of solid chemical. The lawn supplies 88, 90 may or may not be directed to the similar portions of the yard. Some supplies may be directed to sprinklers within a grass area. Other supplies 88, 90 may be directed to plant beds. While other headers 74, 78 may be connected to a common supply 76 at manifold 80. Accordingly, for a given area, multiple chambers 84, 86 may direct their outlets to the specific portion of the yard such as a plant bed. The multiple chambers 84, 86 may be loaded with different chemicals, i.e., one loaded with a fungicide, one loaded with a fertilizer, one loaded with a lime treatment, etc. . . . such that the particular treatment may be provided as the desired time to that portion of the yard while the box 10 may be loaded at a single time or at regular intervals. Furthermore, any particular magazine 54 may be loaded with any particular type of chemical at the discretion of the user or lawn treatment company.

While the system utilizing the box 10 above may require additional piping to support the multiple supplies 76, 88, 90 which would otherwise be branched off at various locations along the yard instead of originating at a common location, the ability for a homeowner or service to have a location to load solid chemicals is believed to be advantageous over the prior art. Furthermore, the chemicals may be loaded for a specific period of time such as a week, a month, or even a year which is believed to be an advantage which greatly outweighs the additional cost of some extra piping placed in the yard. Controller 16 preferably controls the valves within the box 10 as well as any other valves in the system such as inlet valve 14 which is illustrated external to the housing 18.

The controller 16 preferably includes a display 100, an on/off switch 102, a manual override switch 104, and a scheduling button 106. Dial 108 may be utilized to select particular stations such as particular areas of the lawn to be treated or for a particular service such as fertilizing, lawn treatment, insecticides or fungicides to be applied. The use of the scheduling button 106 is believed to be advantageous in that a plurality of preset settings may be programmed into the controller 16 so that the lawns and plant beds are watered and/or treated according to a desired schedule. For instance, the lawn could be feed and seeded in March while the plant beds could be treated with herbicide and fungicide in April, etc. . . . Specifically, the chemical treatment of the yard may be performed with no further interaction other than loading the cylinders by a lawn treatment service and/or the homeowner.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A dispensing apparatus for use with a source of water for directing fluid to particular areas of a yard, said dispensing apparatus comprising:
    a housing having at least one watertight chamber intermediate an inlet and an outlet;
    a magazine having a core and plurality of orifices in an exterior surface, said magazine located within the chamber and positioned in a flow of fluid, wherein at least some of said flow of fluid passes through at least some of the plurality of orifices into the core of the magazine and exits the magazine through at least some of the plurality of orifices; and
    at least one solid tablet of yard treatment chemical from the group of fertilizer, pre-emergent, post-emergent, lime treatment, insecticide, fungicide, and herbicide, located within the core of the magazine, said magazine preventing said at least one solid tablet from exiting the outlet of the chamber at least until said at least one tablet is smaller than one of said plurality of orifices in the exterior surface of the magazine; and
    wherein the housing has a plurality of chambers with inlets and outlets and magazines located therein, said chambers separated from fluid flow with one another downstream of the inlets.

2. The dispensing apparatus of claim 1 wherein the outlets direct fluid to multiple locations within a yard.

3. The dispensing apparatus of claim 2 wherein the outlets direct fluid to at least one of a sprinkler and a feeding tube.

4. The dispensing apparatus of claim 1 wherein at least two of the plurality of chambers are loaded with different chemical treatments.

5. The dispensing apparatus of claim 4 wherein the outlets of the at least two of the plurality of chambers are directed to feed a specific locale in a yard.

6. A dispensing apparatus for use with a source of water for directing fluid to particular areas of a yard, said dispensing apparatus comprising:
    a housing having at least one watertight chamber intermediate an inlet and an outlet;
    a magazine having a core and plurality of orifices in an exterior surface, said magazine located within the chamber and positioned in a flow of fluid, wherein at least some of said flow of fluid passes through at least some of the plurality of orifices into the core of the magazine and exits the magazine through at least some of the plurality of orifices; and
    at least one solid tablet of yard treatment chemical from the group of fertilizer, pre-emergent, post-emergent, lime treatment, insecticide, fungicide, and herbicide, located within the core of the magazine, said magazine preventing said at least one solid tablet from exiting the outlet of the chamber at least until said at least one tablet is smaller than one of said plurality of orifices in the exterior surface of the magazine; and
    wherein the chamber is a first chamber and further comprising a supply line and an isolation valve in communication with the inlet of the first chamber, and a second chamber receiving water from the water supply and having an outlet directing water to a similar locale in the yard as the first chamber.

7. The dispensing apparatus of claim 6 wherein the magazine is spaced from the inlet within the chamber.

8. The dispensing apparatus of claim 6 wherein magazine is secured within the chamber.

9. The dispensing apparatus of claim 6 wherein the outlets of the first and second chamber meet in a manifold and are then directed out a common feeder to the locale in the yard.

10. The dispensing apparatus of claim 9 further comprising an outlet valve intermediate the outlet of the first chamber and the manifold, and said outlet valve located in the housing.

11. The dispensing apparatus of claim 6 further comprising an inlet valve in communication with the inlet of the chamber and a controller in communication with the inlet valve for remote operation of the inlet valve.

12. The dispensing apparatus of claim 6 wherein the magazines are pre-loaded with the at least one solid tablet.

13. The dispensing apparatus of claim 6 wherein the box housing is located along an axis and the axis is substantially transverse to the flow of fluid in the chamber.

14. A dispensing apparatus for use with a source of water for directing fluid to particular areas of a yard, said dispensing apparatus comprising:
    a housing having at least one watertight chamber intermediate an inlet and an outlet;
    a magazine having a core and plurality of orifices in an exterior surface, said magazine located within the chamber and positioned in a flow of fluid, wherein said flow of fluid passes through at least some of the plurality of orifices into the core of the magazine and exits the magazine through at least some of the plurality of orifices; and
    at least one solid tablet of yard treatment chemical from the group of fertilizer, pre-emergent, post-emergent, lime treatment, insecticide, fungicide, and herbicide, located within the core of the magazine, said magazine preventing said at least one solid tablet from exiting the outlet of the chamber at least until said at least one tablet is smaller than one of said plurality of orifices in the exterior surface of the magazine;
    an inlet valve in communication with the inlet of the chamber and a controller in communication with the inlet valve for remote operation of the inlet valve; and
    an isolation valve intermediate the inlet valve and the chamber, said isolation valve in communication with the controller for remote operation of the inlet valve.

15. A dispensing apparatus for use with a source of water for directing fluid to particular areas of a yard, said dispensing apparatus comprising:
    a housing having at least one watertight chamber intermediate an inlet and an outlet;
    a magazine having a core and plurality of orifices in an exterior surface, said magazine located within the chamber and positioned in a flow of fluid, wherein said flow of fluid passes through at least some of the plurality of orifices into the core of the magazine and exits the magazine through at least some of the plurality of orifices; and
    at least one solid tablet of yard treatment chemical from the group of fertilizer, pre-emergent, post-emergent, lime treatment, insecticide, fungicide, and herbicide, located within the core of the magazine, said magazine preventing said at least one solid tablet from exiting the outlet of the chamber at least until said at least one tablet is smaller than one of said plurality of orifices in the exterior surface of the magazine; and
    a controller;
    wherein the housing has a plurality of chambers and having a plurality of isolation valves in communication with a flow from the water supply to the inlet of the plurality of chambers, each of said isolation valves in communication with the controller for remote operation of the isolation valves.

16. The dispensing apparatus of claim 15 further comprising outlets from the chambers and wherein the outlets of at least two of the chambers are not in fluid communication with one another, said outlets directing fluid to a specific location in the yard, and said controller configured to selectively open at least one of the isolation valves to supply fluid from the chamber to the specific location in the yard, and said isolation valves located in the housing.

17. The dispensing apparatus of claim 16 wherein only one of the at least two chambers supplies water to the specific location at a given time.

18. A method of treating a yard with chemical treatment comprising the steps of:
- placing a first solid chemical treatment tablet within a first magazine having a plurality of orifices therethrough an exterior surface of the magazine, said first magazine located within a first chamber having an inlet and an outlet with a source of water connected to the inlet and said outlet directed to at least a portion of a yard;
- placing a second solid chemical treatment tablet within a second magazine having a plurality of orifices therethrough an exterior surface of the magazine, said second magazine located within a second chamber having an inlet and an outlet with a source of water connected to the inlet and said outlet directed to at least a portion of a yard;
- selectively initiating a supply of fluid through the inlet of the chamber into at least one of the first and second chambers;
- dissolving at least a portion of the solid chemical treatment into a solution and as fluid enters through at least some of the plurality of orifices and exits through at least some of the plurality of orifices;
- directing the solution out the outlet of the chamber to a specific location in a yard; and
- providing at least one of a fertilizer treatment, a lime treatment, an insecticide treatment, a fungicide treatment, a herbicide treatment, a pre-emergent treatment, a post emergent treatment to the specific location in the yard through the application of the solution to the specific location in the yard.

19. The method of claim 18 wherein the application of the solution to the specific location in the yard is performed through the use of one of a sprinkler and a mister.

* * * * *